United States Patent
Fleury et al.

(10) Patent No.: US 11,506,784 B2
(45) Date of Patent: Nov. 22, 2022

(54) ARRAY OF ULTRASONIC TRANSDUCER ELEMENTS

(71) Applicant: IMASONIC, Voray sur l'Ognon (FR)

(72) Inventors: Gerard Fleury, Pouilley les Vignes (FR); Jean-Luc Guey, Ecole-Valentin (FR)

(73) Assignee: IMASONIC, Voray sur l'Ognon (FR)

( * ) Notice: Subject to any disclaimer, the term of this patent is extended or adjusted under 35 U.S.C. 154(b) by 949 days.

(21) Appl. No.: 16/305,031

(22) PCT Filed: May 31, 2017

(86) PCT No.: PCT/EP2017/063156
§ 371 (c)(1),
(2) Date: Nov. 27, 2018

(87) PCT Pub. No.: WO2017/207627
PCT Pub. Date: Dec. 7, 2017

(65) Prior Publication Data
US 2020/0319336 A1    Oct. 8, 2020

(30) Foreign Application Priority Data
May 31, 2016    (FR) .................................... 1654886

(51) Int. Cl.
G03B 42/06    (2021.01)
G01S 15/89    (2006.01)
B06B 1/06    (2006.01)

(52) U.S. Cl.
CPC ........ G01S 15/8915 (2013.01); B06B 1/0637 (2013.01)

(58) Field of Classification Search
None
See application file for complete search history.

(56) References Cited

U.S. PATENT DOCUMENTS 5,339,282 A * 8/1994 Kuhn .................... G01S 7/5205
                                                    367/7
5,520,188 A * 5/1996 Hennige .............. A61B 8/0833
                                                    310/367
(Continued)

FOREIGN PATENT DOCUMENTS

EP    0225120 A2    6/1987
EP    1398627 A2 *    3/2004    ............. G01N 29/38
(Continued)

OTHER PUBLICATIONS

Preliminary Research Report received for French Application No. 1654886, dated Jan. 16, 2017, 3 pages (1 page of French Translation Cover Sheet and 2 pages of original document).
(Continued)

*Primary Examiner* — Isam A Alsomiri
*Assistant Examiner* — Jonathan D Armstrong
(74) *Attorney, Agent, or Firm* — Womble Bond Dickinson (US) LLP

(57) ABSTRACT

The invention relates to a matrix array of ultrasonic transducer elements comprising a plurality of transducer elements that are distributed over a distribution area, each of the transducer elements being suitable for emitting, from an emission surface, ultrasound at a frequency comprised between 100 kHz and 100 MHz, wherein: each of the transducer elements is configured to emit ultrasound divergently at least level with the working volume; the largest dimension of the emission area of each of said transducer elements is larger than 1.5 times the wavelength of the ultrasound in water at 30° C.; and the distribution of the transducer elements over the distribution area of the array is aperiodic.

13 Claims, 6 Drawing Sheets

(56) References Cited

U.S. PATENT DOCUMENTS

Figure 1:
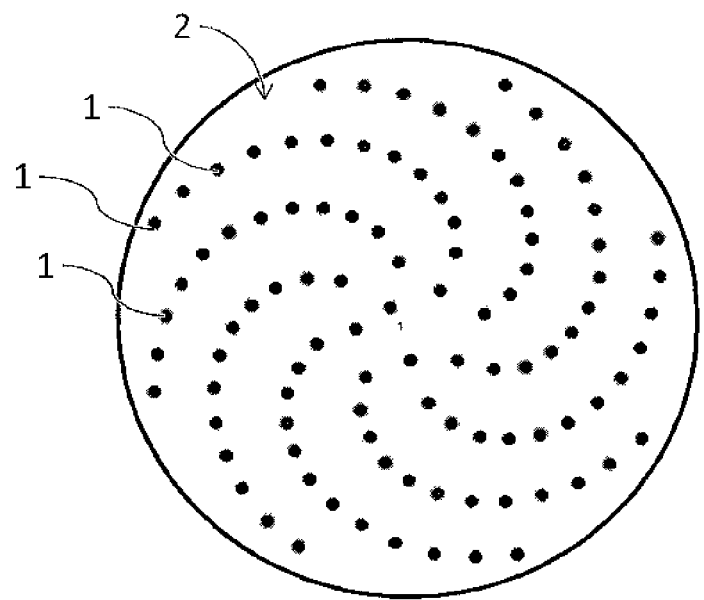

| | | | |
|---|---|---|---|
| 6,613,004 B1 * | 9/2003 | Vitek | A61N 7/02 601/2 |
| 8,278,799 B1 * | 10/2012 | Lupien | G01N 29/34 310/334 |
| 8,649,242 B2 | 2/2014 | Martin et al. | |
| 10,943,578 B2 * | 3/2021 | Long | G10K 11/34 |
| 2012/0029353 A1 * | 2/2012 | Slayton | A61B 8/4254 600/439 |
| 2014/0219062 A1 * | 8/2014 | Rothberg | G10K 9/12 367/135 |
| 2015/0032000 A1 * | 1/2015 | Park | A61B 8/4488 600/438 |

FOREIGN PATENT DOCUMENTS

| | | | | |
|---|---|---|---|---|
| EP | 2107388 A1 * | 10/2009 | ......... | G01S 15/8927 |
| EP | 3147037 A3 * | 5/2017 | ........... | A61B 8/4209 |
| FR | 2923612 A1 | 5/2009 | | |
| NL | 2014025 B1 * | 10/2016 | ........... | B06B 1/0633 |
| WO | 2007/017781 A2 | 2/2007 | | |
| WO | WO-2009020617 A1 * | 2/2009 | ........... | A61B 8/4461 |
| WO | WO-2016099279 A1 * | 6/2016 | ........... | B06B 1/0633 |

OTHER PUBLICATIONS

International Search Report and Written Opinion received for PCT Patent Application No. PCT/EP2017/063156, dated Aug. 16, 2017, 18 pages (8 pages of English Translation and 10 pages of Original Document).

International Preliminary Report on Patentability received for PCT Patent Application No. PCT/EP2017/063156, dated Dec. 13, 2018, 14 pages (7 pages of English Translation and 7 pages of Original Document).

Gavrilov et al., "A theoretical Assessment of the Relative Performance of Spherical Phased Arrays for Ultrasound Surgery", IEEE Transactions On Ultrasonics, Ferroelectrics and Frequency Control, vol. 47, No. 1, Jan. 2000, pp. 125-139.

* cited by examiner

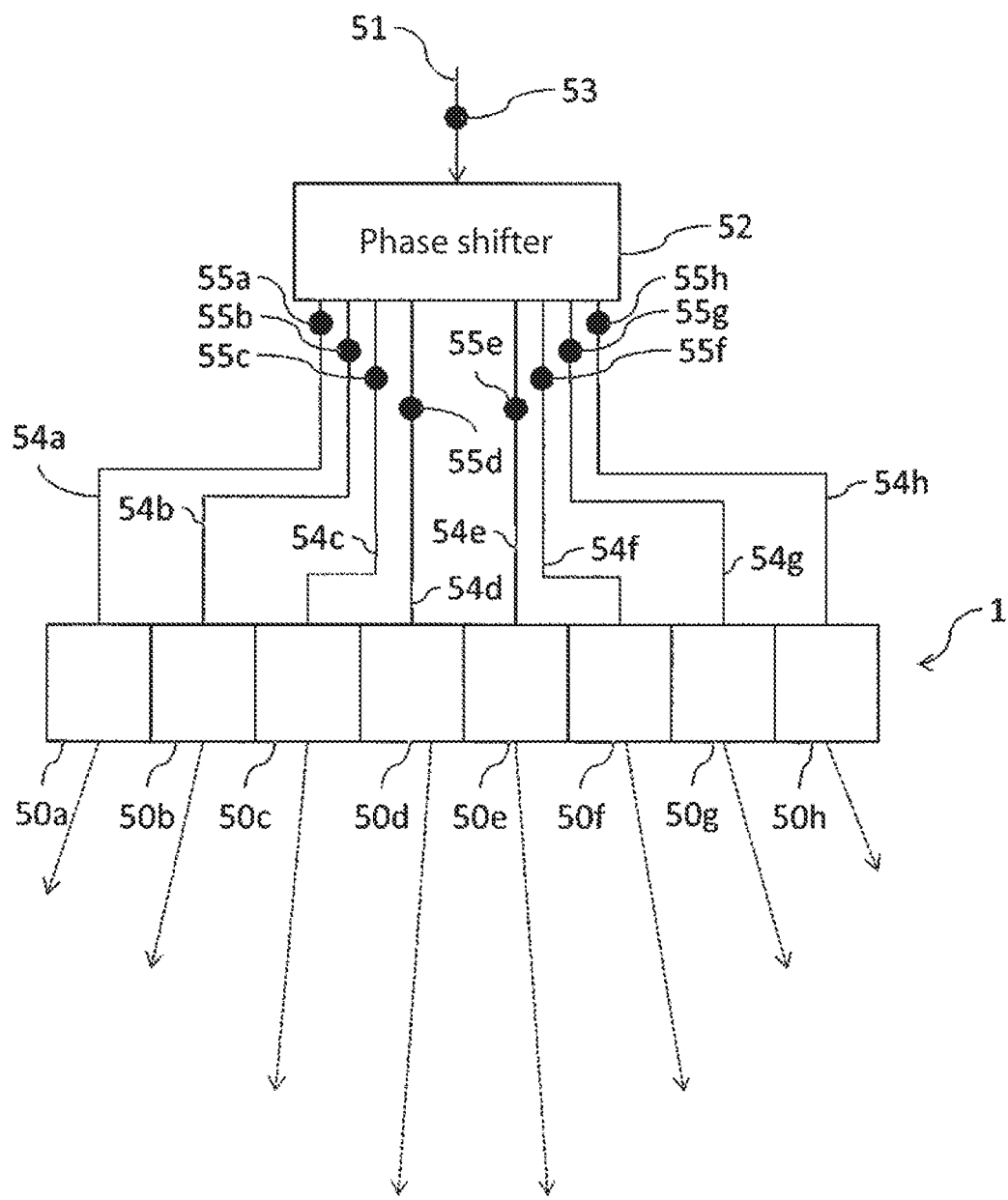

ARRAY OF ULTRASONIC TRANSDUCER ELEMENTS

The present invention pertains to the field of ultrasonic transducers. More specifically, the invention relates to an array of ultrasonic transducer elements comprising a plurality of transducer elements that are distributed over a distribution area.

Ultrasounds have been used for a long time in imaging, whether for medical or industrial applications. Ultrasonic transducers organised in an array are used to generate and/or to detect these ultrasounds. The most common type of array is the one-dimensional array, called 1D array, in which the transducer elements are aligned. However, a 1D array only enables scanning of the ultrasonic beam in one plane. Matrix arrays, called 2D arrays since the transducer elements are distributed over two dimensions, have been developed to enable volume scanning and better focusing.

For applications such as ultrasonic echography, it is sought to have a matrix array of transducer elements capable of deflecting the ultrasonic beam, that is to say displacing the ultrasonic beam by adjusting the delays in the emissions of ultrasounds by the different transducer elements constituting the array. The transducer elements are activated according to successive phases determined by computer calculation in order to direct the emitted beam. This is known as phase control array or "phased array".

Conventionally, matrix arrays of transducer elements group together transducer elements of small dimension compared to the wavelength of the ultrasounds in water at the operating frequency of the transducer elements. These transducer elements being of small size, in terms of emitting area, the emitted beams are naturally divergent by diffraction, that is to say that the ultrasonic wave beam emitted by such a transducer element widens on moving away from the transducer element. The angular range that can be scanned by the ultrasounds by means of the phase command of the transducer elements is all the greater the more divergent the emitted beam. The divergence of these small transducer elements thus makes it possible to scan a wider angular range.

Furthermore, the ultrasonic beam emitted by an array may have array lobes when the pitch of the array, that is to say the average centre to centre distance between two neighbouring transducer elements, exceeds half the wavelength of the ultrasounds in water at the maximum frequency of the transducer elements. These array lobes are all the more important as the pitch increases. It is then sought to restrict the spacing between the small transducer elements, such that the pitch of the array is small compared to the wavelength of the ultrasounds in water at the operating frequency of the transducer elements. On account of the small dimension of the transducer elements, the small pitch of the array and the limited number of elements controllable by an ultrasonic imaging system commercially available at the present time (several hundred maximum), the array generally has a small size.

It may however be desired to obtain an array of large dimension, for example to increase sensitivity in the case of ultrasonic echography or to increase antenna gain in the case of high intensity focused ultrasounds, or instead to make it possible to produce images under different viewing angles without displacing the array. In this case, the number of transducer elements required so that the array covers a large area, while conserving the aforementioned dimensioning constraints, becomes very important.

As an example, for a frequency of 5 MHz, the wavelength $\lambda$ in water is equal to 0.3 mm. A matrix array covering an area of 30 mm×30 mm must thus have at the least 40,000 elements while retaining an array pitch less than $\lambda/2$, that is to say 0.15 mm, in the two directions.

The command of as many transducer elements then becomes problematic, not just at the level of the connections required, but also the management of the calculations.

Using larger transducer elements in order to limit the number of elements to command is problematic. Indeed, a transducer element is all the more directive the larger its emission area. Transducer elements of large size limit the possible amplitude of deflection for ultrasounds. Moreover, on account of the large size of the transducer elements, the pitch of the array is large. Array lobes then appear, of which the interferences degrade the quality of the ultrasounds and thereby distort the image obtained by means of these ultrasounds.

DESCRIPTION OF THE INVENTION

The aim of the invention is to resolve at least a part and preferably all of these drawbacks, and notably aims to propose an array of ultrasonic transducer elements that enable a wide angular scanning of the emitted ultrasonic beam, while limiting the number of transducer elements to command and with a beam geometry in which the main lobe has a much greater amplitude than that of parasitic lobes created outside of the main direction.

To this end, the invention proposes a matrix array of ultrasonic transducer elements comprising a plurality of transducer elements that are distributed over a distribution area, each of the transducer elements being suitable for emitting, from an emission area, ultrasounds at a frequency comprised between 100 kHz and 100 MHz in the direction of a working volume, remarkable in that:
  each of the transducer elements is configured to emit ultrasounds in a divergent manner at least at the level of the working volume;
  said transducer elements each have a largest dimension of their emission area greater than 1.5 times the wavelength of the ultrasounds in water at 30° C.,
  the distribution of the transducer elements over the distribution area of the array is aperiodic.

The matrix array of ultrasonic transducer elements is advantageously completed by the following characteristics, taken alone or in any technically possible combinations thereof:
  the distribution of the transducer elements over the distribution area has an absence of symmetry;
  the array of transducers comprises at least 64 transducer elements and the largest dimension of the distribution area over which said transducer elements are distributed is greater than twelve times the wavelength of the ultrasounds in water at 30° C.;
  the distribution area has a concave geometry seen from the direction of emission of the ultrasonic waves;
  the emission area of the transducer elements has a convex shape seen from the direction of emission of the ultrasonic waves;
  each transducer element is provided with a divergent acoustic lens;
  the divergent acoustic lens comprises at least two layers of materials arranged in the direction of emission, a first layer of material close to the transducer element, in which the ultrasounds propagate at a higher velocity than in water, and a second layer of material, further away from the transducer element, in which the ultrasounds propagate at a lower velocity than in water;

the interface between the two layers of materials of the divergent acoustic lens has a convex shape, such that the distance between said interface and the emission area is greater at the centre of the emission area compared to its periphery;

each transducer element is composed of several emission zones each commanded in emission by a local emission signal, and a phase shifter receiving from a command channel an overall emission signal for the whole of a transducer element and emitting in the direction of each of the emission zones of said transducer element the local emission signal specific to said emission zone, said local emission signal being delayed with respect to said overall emission signal by a delay that is all the greater the further away the zone for which said local emission signal is destined is from the centre of the transducer element;

the elementary focal length between the emission area of a transducer element and the elementary focal point of said transducer element is less than the overall focal length between the distribution area and an overall focal point of the matrix array of ultrasonic transducer elements;

the transducer elements each have an elementary focal point distinct from the elementary focal points of the other transducer elements;

each transducer element is provided with a convergent acoustic lens;

each transducer element is composed of several emission zones each commanded in emission by a local emission signal, and a phase shifter receiving from a command channel an overall emission signal for the whole of a transducer element and emitting in the direction of each of the emission zones of said transducer element the local emission signal specific to said emission zone, said local emission signal being delayed with respect to said overall emission signal by a delay that is all the greater the closer the zone for which said local emission signal is destined is to the centre of the transducer element.

PRESENTATION OF THE FIGURES

Figure 2:
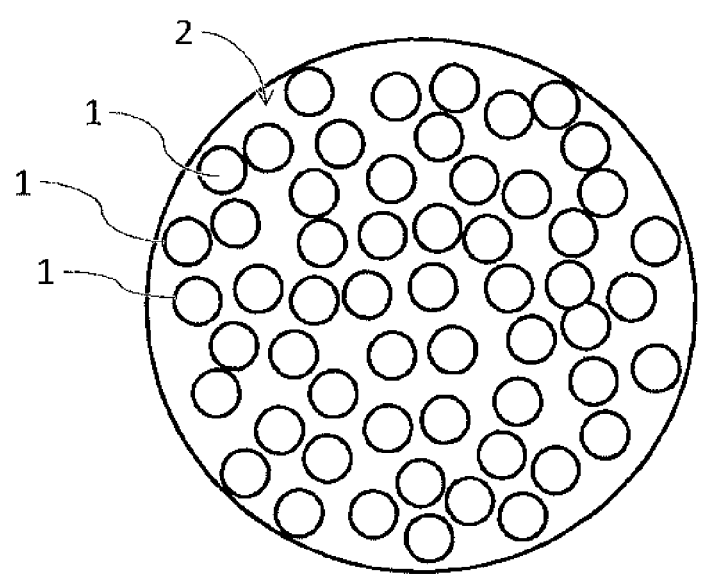
Figure 3:
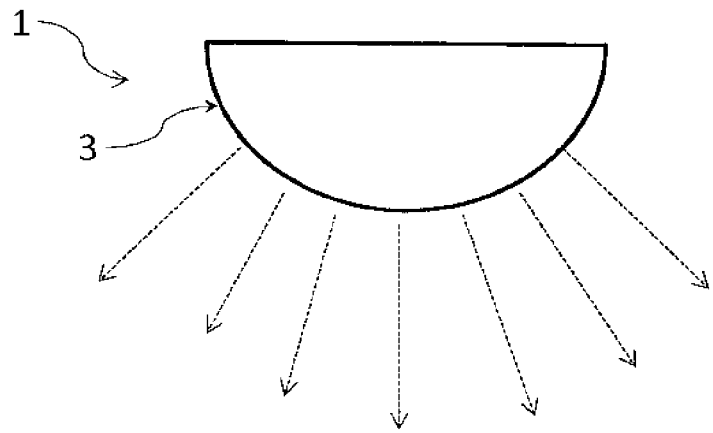
Figure 4:
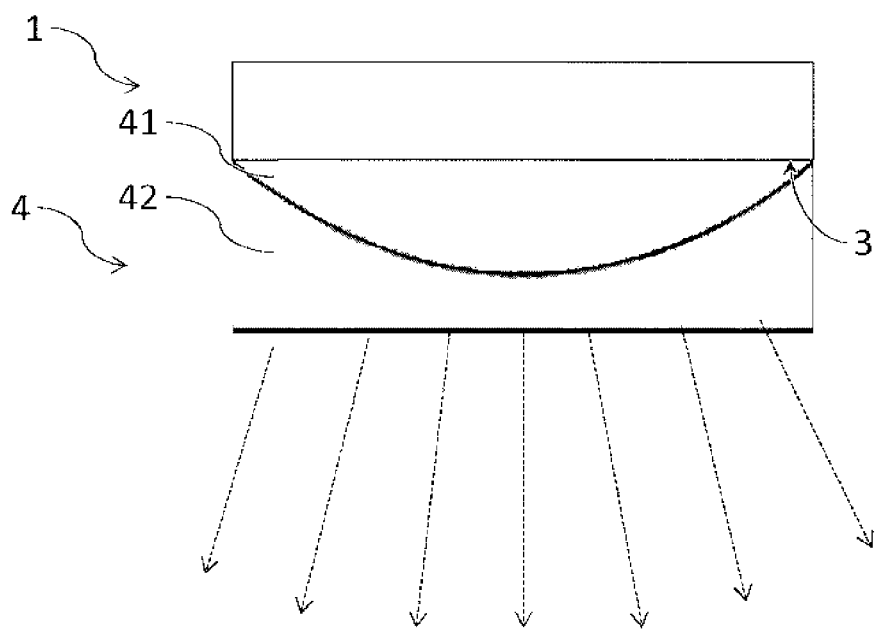
Figure 5:
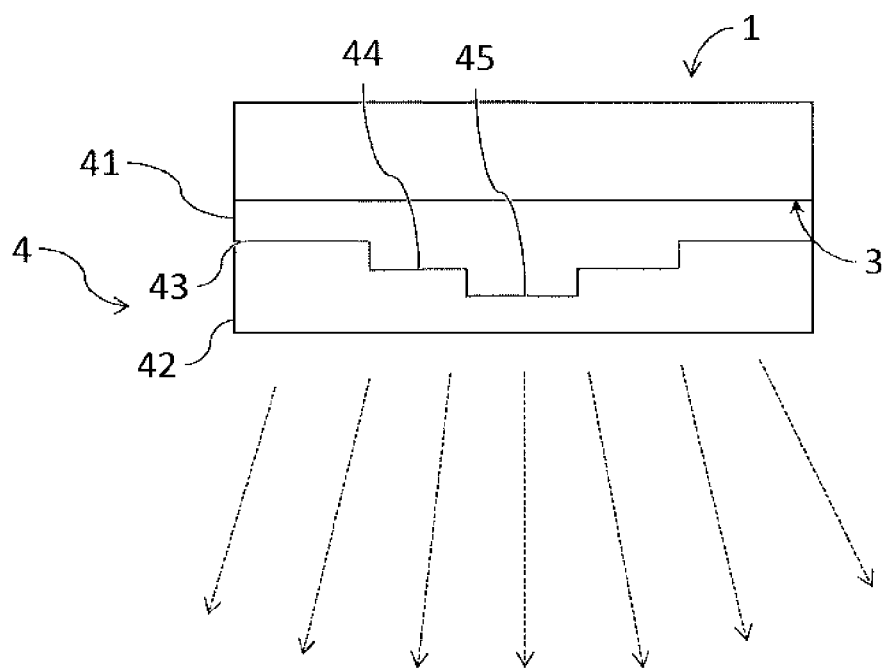
Figure 6B:
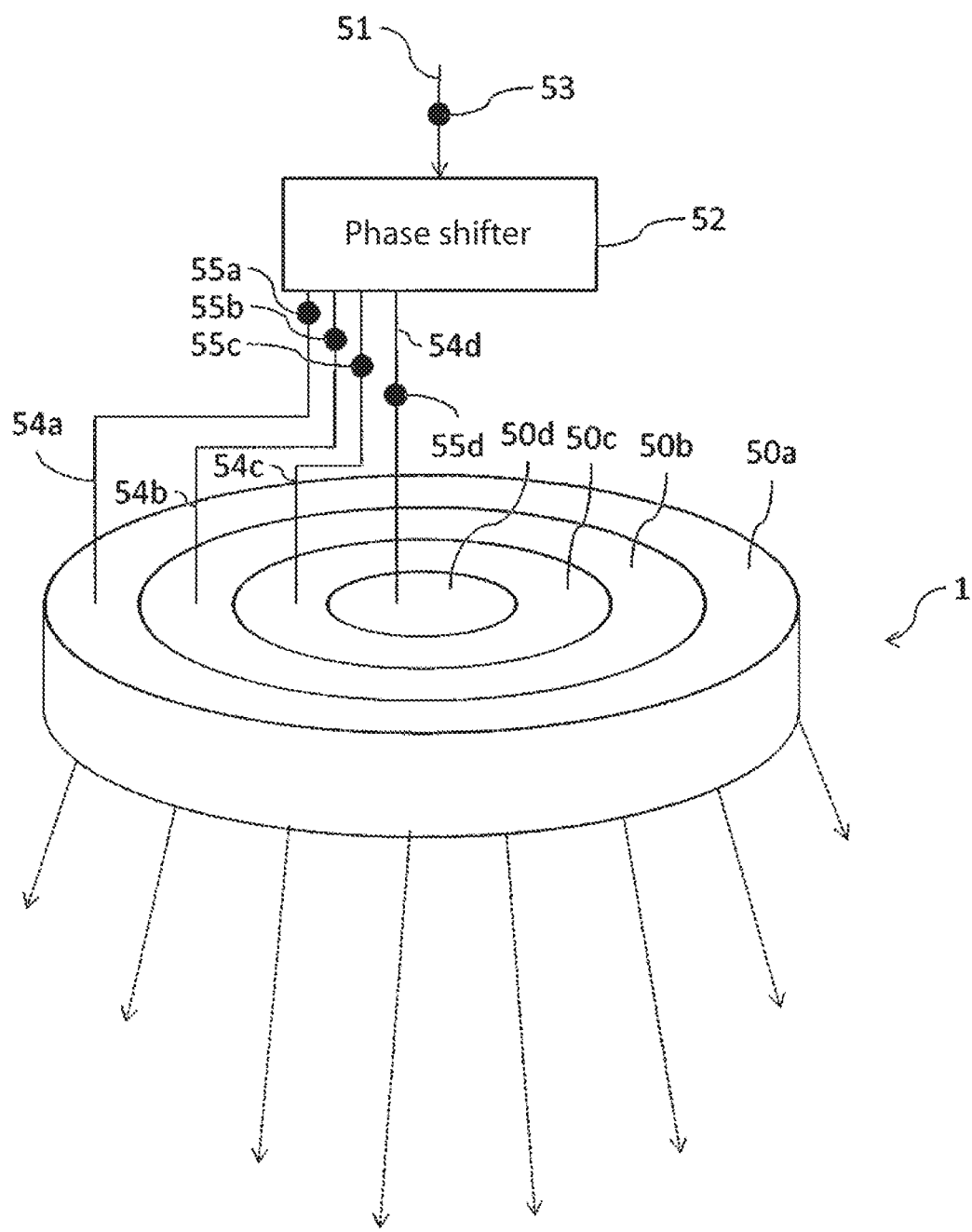
Figure 7:
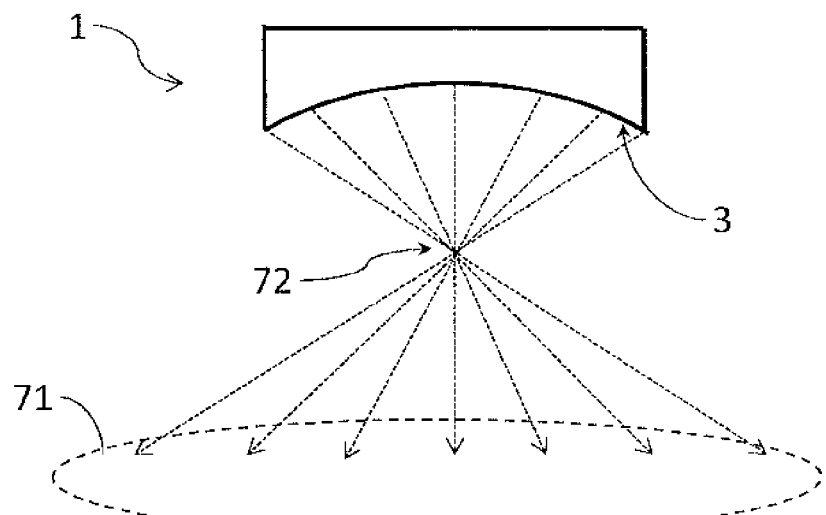
Figure 8:
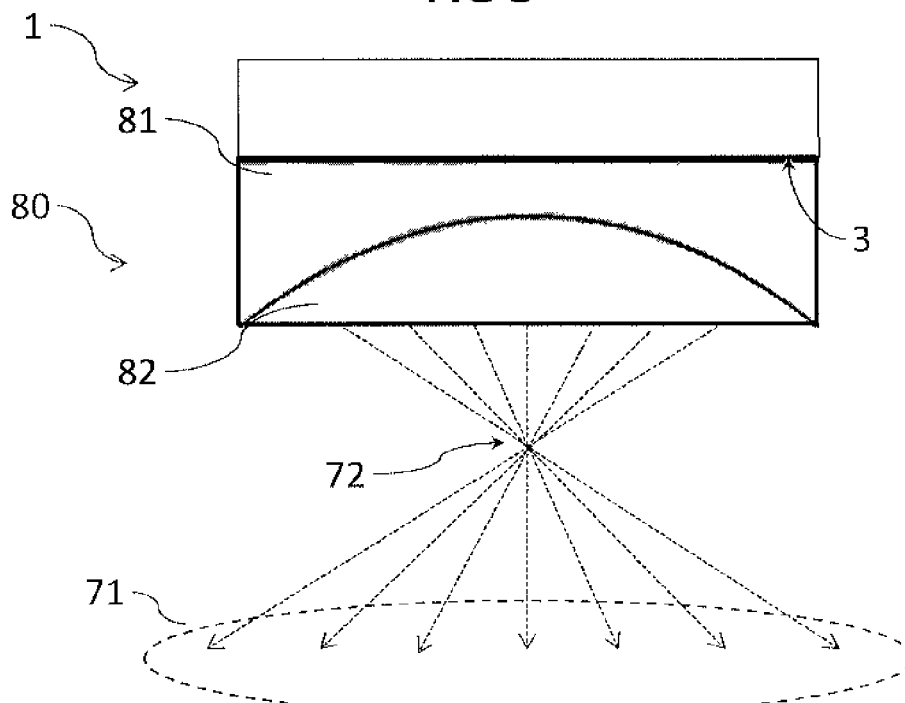

The invention will be better understood thanks to the following description, which relates to embodiments and alternatives according to the present invention, given as non-limiting examples and explained with reference to the appended drawings, wherein:

FIGS. 1 and 2 illustrate a simplified overview of an array of ultrasonic transducer elements according to possible embodiments of the invention;

FIG. 3 schematically illustrates the convex geometry of the emission area of an ultrasonic transducer element;

FIGS. 4 and 5 schematically illustrate two examples of ultrasonic transducer elements comprising a divergent acoustic lens;

FIG. 6a schematically illustrates an ultrasonic transducer element comprising several emission zones;

FIG. 6b schematically illustrates an alternative of FIG. 6a wherein the transducer element comprises several annular concentric emission zones;

FIG. 7 schematically illustrates the concave geometry of the emission area of an ultrasonic transducer element;

FIG. 8 schematically illustrates an example of ultrasonic transducer element comprising a convergent acoustic lens.

DETAILED DESCRIPTION

With reference to FIGS. 1 and 2, the array of ultrasonic transducer elements comprises a plurality of transducer elements 1 that are distributed over a distribution area 2. Each transducer element 1 is suitable for emitting ultrasounds at a frequency comprised between 100 kHz and 100 MHz, and preferably between 200 kHz and 50 MHz. The greatest dimension of the distribution area 2 over which said transducer elements are distributed is greater than $12\lambda$ in at least one direction, $\lambda$ being the wavelength of the ultrasonic waves emitted in water at 30° C., and further preferably greater than $40\lambda$.

The array may comprise between 64 and several thousand transducer elements 1, for example 128, 256, 512 or 1024 transducer elements 1. Each transducer element 1 is independently controlled by a command channel carrying an emission signal. There are thus as many command channels as transducer elements 1. Preferably, the array comprises at least 128 transducer elements 1. Preferably, the fill rate of the distribution area 2 by the transducer elements 1 is greater than 60%.

The transducer elements of the array may be identical or may be different, and for example vary in frequency and/or in geometry, including non-axisymmetric. Furthermore, all or part of the transducer elements 1 can operate not only in emission but also in reception.

Preferably, the distribution area 2 of the array has a flat or concave geometry. Moreover, the distribution of the transducer elements 1 over the distribution area 2 is aperiodic. In particular, the distances of the elements between each other or with respect to the centre do not have a period.

Preferably, the distribution of the transducer elements 1 over the distribution area 2 has an absence of symmetry, and notably an absence of axial symmetry.

The distribution of the transducer elements 1 over the distribution area 2 has the least symmetry possible. Thus, preferably, the distribution of the transducer elements 1 over the distribution area 2 also has an absence of symmetry of rotation. The absence of symmetry in the distribution of the transducer elements 1 over the distribution area 2 makes it possible to avoid reconstructions of array lobes alongside the main lobe of the ultrasounds emitted by the array.

For example, FIG. 1 illustrates a so-called Fermat spiral distribution of the transducer elements 1, which is aperiodic and does not have symmetry. The distribution of the transducer elements 1 over the distribution area 2 may also be a random or pseudo-random distribution, which is also aperiodic and has an absence of symmetry. FIG. 2 illustrates an example of random distribution of the transducer elements 1 over the distribution area 2.

The transducer elements 1 emit ultrasounds in the direction of emission from an emission area, the direction of emission constituting the front of the transducer element. Each of the transducer elements has a largest dimension of its emission area 3 greater than 1.5 times the wavelength $\lambda$ of the ultrasounds that it emits in water at 30° C., the frequency of the ultrasounds being comprised between 200 kHz and 50 MHz. Typically, the large dimension of the emission area 3 is comprised between $3\lambda$ and $10\lambda$. Table 1 below explains this dimensioning, with a velocity in water at 30° C. of 1500 m·s$^{-1}$.

TABLE 1

| Frequency in MHz | 0.2 | 0.5 | 1.0 | 5.0 | 10 | 50 |
|---|---|---|---|---|---|---|
| Wavelength λ in water in mm | 7.5 | 3.0 | 1.5 | 0.3 | 0.15 | 0.03 |
| Dimension threshold of an element (1.5λ) in mm | 11.25 | 4.5 | 2.25 | 0.45 | 0.225 | 0.045 |
| Typical dimension value of an element (between 3λ and 10λ) in mm | 22.5 to 75 | 9 to 30 | 4.5 to 15 | 0.9 to 3 | 0.45 to 1.5 | 0.09 to 0.3 |

Thus, for a transducer element 1 configured to emit ultrasounds at an operating frequency of 1 MHz, the largest dimension of its emission area 3 is greater than 2.25 mm.

This dimensioning of the transducer elements 1 makes it possible to obtain an array of large dimension, without however, on account of their sizes, having too many transducer elements to command. The large size of the transducer elements is however detrimental to the deflection capacity of the beam.

Consequently, the transducer elements 1 are configured to emit ultrasounds that propagate in a divergent manner. The term divergent transducer elements is used. The ultrasonic radiation of a transducer element 1 is caused by the vibration of the transducer element 1, commanded by the command channel that is associated therewith, which is going to lead to a displacement field in the propagation medium. This field extends in a more or less anisotropic manner in the propagation medium, with generally a greater intensity in a favoured direction constituting the acoustic axis, and being attenuated with angular distancing from this axis. A transducer element 1 is divergent when the attenuation of the intensity with angular distancing from the acoustic axis is low.

The divergence of a transducer element 1 may be measured acoustically. This is known as measurement of directivity or, more specifically, measurement of angular acceptance. It is a measurement in water of the amplitude of the ultrasounds emitted by a transducer element 1 of the array in its emission field. At a given distance, a hydrophone (transducer of small dimension used in reception) records the pressure emitted as a function of the measuring angle. The angular acceptance corresponds to the angular opening for which the measured amplitude is above a threshold, for example −3 dB compared to the maximum in water at 30° C. It is considered here that a transducer element is divergent when the angular acceptance at −3 dB compared to the maximum is at least 10% greater than that of an equivalent flat transducer of same dimension.

As an example, the angular acceptance 2θ of a flat circular element may be determined analytically by an analytical formula given in the work "Acoustic Waves: Devices, Imaging, and Analog Signal Processing" by Gordon. S. KINO, Prentice Hall Inc., 1987, ISBN 978-0130030474.

According to this formula, for a transducer of diameter 2a operating at the frequency corresponding to the wavelength λ in the propagation medium considered, the half-angle θ of the angular acceptance at −3 dB is equal to, in radians:

$$\theta = 0.25 \lambda / a$$

By considering a transducer element 1 operating at 1 MHz with 70% pass band, with a circular geometry and its diameter 2a (or opening) is 9 mm (i.e. around 6 wavelengths in water), a half-angle θ of angular acceptance in degrees of around 4.8° is then obtained, and thus an angular acceptance 2θ of around 8.6°, which can be rounded off to 10° to simplify matters.

From this example, a circular transducer element 1 of a diameter of 9 mm is then considered as divergent if its angular acceptance is at least 11°, i.e. 10% more than the angular acceptance calculated for a circular transducer element 1 of same diameter according to the formula set out above.

It should be noted that for a non-spherical geometry of transducer element 1 or for a transducer element 1 of non-circular contour, no analytical formula generally exists for expressing the angular acceptance as a function of the geometric characteristics of the transducer. A discretisation method (finite elements, finite differences, etc.) may then be used to model the field emitted by such a transducer.

With reference to FIGS. 3, 4, 5 and 6, different types of divergent transducer elements 1 are represented, for illustrative and non-limiting purposes, illustrating different techniques that can be implemented to obtain this divergence. Other techniques may be employed, as can combinations of techniques.

As illustrated in FIG. 3, the emission area 3 of a transducer element 1 may have a convex shape in the direction of emission of the ultrasonic waves, illustrated in the figures by dashed arrows. The convexity of the emission area 3 of a transducer element 1 may be measured by a mechanical method such as a probing, or by an optical method, such as contactless scanning. It is then possible to determine a radius of curvature of this emission area 3, notably in the case of a spherical convexity such as that illustrated in FIG. 3.

To give an example of dimensioning of such a convex divergent transducer element, a transducer element 1 operating at 1 MHz with 70% pass band is again considered, with a circular geometry and its diameter 2a is 9 mm (i.e. around 6 wavelengths in water). For explanatory and non-limiting purposes, it is assumed that the emitting area is convex and spherical of radius of curvature R. The radius of curvature R is sought such that the angular acceptance at −3 dB of the convex transducer element is increased by 10% compared to that of a flat circular transducer element of same diameter 2a, which is 10° according to the calculations set out above.

In this example, the convex emitting area is thus approximated by a portion of sphere of radius R and of chord 2a, constituting the diameter of the spherical transducer element. By simulation and calculation, it is possible to determine that the angular acceptance at −3 dB of the spherical transducer element is greater than 11° (10°+10%) when R<20 mm. Consequently, such a convex transducer element of 9 mm diameter operating at 1 MHz is considered as divergent if the spherical radius, or radius of curvature, of its front face is less than 20 mm. In this case the deflection measurable on the front face of the element is greater than 0.5 mm.

FIGS. 4 and 5 illustrate another possibility for obtaining or accentuating the divergence of an ultrasonic transducer element 1. The transducer element 1 may be provided with a divergent acoustic lens 4. This divergent acoustic lens 4 is arranged in the direction of emission of the ultrasonic waves, in front of the emission area 3 of the ultrasonic transducer element 1.

Such a divergent acoustic lens 4 may for example be constituted of a dioptre of materials characterised by different ultrasound propagation velocities inside said materials. A material in which the ultrasounds propagate at a higher velocity than in water, for example a metal or a polymer, may be associated with a material in which the ultrasounds propagate at a lower velocity than in water, for example a silicone elastomer.

Thus, such a divergent lens 4 may comprise two assembled layers of materials: a first layer 41 of material close to the emission area 3 of the transducer element 1, in which the ultrasounds propagate at a higher velocity than in water, and a second layer 42 of material, further away from the emission area 3 of the transducer element 1, in which the ultrasounds propagate at a lower velocity than in water.

In FIG. 4, the interface between the first layer 41 of material and the second layer 42 of material is convex, such that this interface is further away from the emission area 3 at the level of the centre of the transducer element than at its periphery. The interface may not be curved or regular as in FIG. 4. The divergent lens 4 may have an interface between the first layer 41 of material and the second layer 42 of material that is tiered between several levels. These levels are all the further away from the emission area 3 the closer they are to the centre.

Thus, for example, FIG. 5 illustrates a divergent lens 4 comprising a first layer 41 and a second layer 42, with a first peripheral region 43 in which the interface between these two layers is close to the emission area, then a second intermediate region 44 closer to the centre in which the interface is further away from the emission area 3, and a central region 45 in which the interface is even further away from the emission area 3.

The advantage of such a tiered structure comes from its greater ease of production compared to a lens structure such as that of FIG. 4. For reasons of simplicity, the lens of FIG. 5 is represented with only three levels or tiers. Another number of tiers may be envisaged. Indeed, for acoustic reasons, it may be preferable to discretize more the shape of the interface between the two layers of material 41, 42 composing the lens. Indeed, the geometry of the tiered interface is preferably representative of the ideal area represented by FIG. 4. A compromise thus has to be found concerning the number of tiers by considering both the gain in ease of manufacture and the loss of acoustic focusing/defocusing performance of the acoustic lens 4.

It is also possible to provide that the transducer element 1 is composed of several adjacent emission zones. FIG. 6*a* illustrates an example of such a transducer element 1. The transducer 1 is composed of eight emission zones 50*a*, 50*b*, 50*c*, 50*d*, 50*e*, 50*f*, 50*g*, 50*h*. These emission zones 50 are electrically, or even mechanically, separated from each other. The emission zones 50 are distinguished by their arrangement, and in particular by their different distances from the centre of the transducer element 1. For example, such a transducer element 1 may be constituted of annular concentric emission zones 50 as schematically illustrated in FIG. 6*b*.

As indicated above, each transducer element is controlled independently by a command channel 51 carrying an emission signal. There are thus as many command channels 51 as transducer elements 1. A phase shifter 52 receives from the command channel 51 an overall emission signal for the whole of the transducer element 1. This overall emission signal carries an emission excitation shown schematically in FIGS. 6 and 6*bis* by a point 53.

Each of the emission zones 50*a*, 50*b*, 50*c*, 50*d*, 50*e*, 50*f*, 50*g*, 50*h* is connected to the phase shifter 52 by a local command channel 54*a*, 54*b*, 54*c*, 54*d*, 54*e*, 54*f*, 54*g*, 54*h*.

From the overall emission signal, the phase shifter 52 emits in the direction of each of the emission zones 50 of the transducer element 1 *a* local emission signal specific to said zone. This local emission signal transits via the local command channel 54 associated with said emission zone 50. A local emission signal carries a local emission excitation shown schematically in FIG. 6*a* by the points 55*a*, 55*b*, 55*c*, 55*d*, 55*e*, 55*f*, 55*g*, 55*h*, respectively 55*a*, 55*b*, 55*c*, 55*d* for FIG. 6*b*.

The phase shifter 52 determines a local emission signal from the overall emission signal by temporally delaying the excitation 53 carried by the overall emission signal, by the introduction of a phase shift introduced electrically. A local emission signal is delayed with respect to said overall emission signal by a delay that is all the greater the further away the zone 50 for which said local emission signal is destined is from the centre of the transducer element 1.

Thus, in FIG. 6*a* and FIG. 6*b*, the points 55*a*, 55*b*, 55*c*, 55*d*, 55*e*, 55*f*, 55*g*, 55*h* and in FIG. 6*b* the points 55*a*, 55*b*, 55*c*, 55*d* schematically showing local emission excitations are represented shifted on their respective local command channels 54*a*, 54*b*, 54*c*, 54*d*, 54*e*, 54*f*, 54*g*, 54*h*. The two excitations 55*d*, 55*e* destined for the two emission zones 50*d*, 50*e* the closest to the centre of the transducer element 1 in FIG. 6*a* are temporally in advance with respect to the excitations 55*c*, 55*f* destined for the adjacent emission zones 50*c*, 50*f* which are further away from the centre of the transducer element 1, themselves temporally in advance with respect to the excitations 55*b*, 55*g* destined for the adjacent emission zones 50*b*, 50*g* which are further away from the centre of the transducer element 1. The excitations 55*a*, 55*h* destined for the emission zones 50*a*, 50*h* the furthest away from the centre of the transducer element 1 are the most delayed. This phase shift of local excitations 55 enables the divergence of the emitted ultrasounds.

The transducer elements 1 may also be configured to emit ultrasounds in a divergent manner only at the level of a working volume. FIG. 7 thus shows a transducer element 1 that emits ultrasounds in a convergent manner into an elementary focal point 72. Once this elementary focal point 72 has been passed, the ultrasounds diverge, and, are incident in a divergent manner at the level of a working area 71.

The working area 71 represented corresponds to a limit beyond which is defined the working volume for the matrix array of transducer elements. The overall focal point of the matrix array of transducer elements is contained in this working volume, and may potentially travel across it. It is thus possible to define the working volume as being the place of the overall focal points of the matrix array of transducer elements travelled in deflection. The working volume thus corresponds to the target volume for the emitted ultrasonic waves, and of which it is sought to determine the characteristics by ultrasounds.

The elementary focal points of the different transducer elements 1 are distinct and not merged. The ultrasonic beams emitted by a transducer element 1 may thus be convergent before their respective elementary focal point 72, then divergent at the level of the working volume that is common to them, beyond the working area 71.

Highly convergent transducer elements are thus used, which have however, on account of this strong convergence, an angular acceptance at −3 dB with respect to the maximum at the level of the working area 71 which is at least 10% greater than that of an equivalent flat transducer of same dimension.

The elementary focal length of a transducer element 1 between the emission area 3 and the elementary focal point

72 of said transducer element 1 is less than the focal length of the array between the distribution area 2 and the overall focal point of the array, and preferably less than half thereof. For example, in the case of a matrix array with a concave distribution area 2 (seen from the direction of emission), the centre of curvature of the distribution area 2 at the level of a transducer element 1 is at least two times further away from the emission area 3 of said transducer element 1 than the elementary focal point 72 of said transducer element 1.

It is thus possible to use convergent transducers configured in the matrix array to emit ultrasounds in a divergent manner as explained above. As illustrated in FIG. 7, the emission area 3 of a transducer element 1 may have a concave shape in the direction of emission of the ultrasonic waves, illustrated in the figures by dashed arrows.

In the same way as in the case of FIG. 4, it is possible to equip a transducer element 1 with a lens that this time is convergent, and illustrated in FIG. 8. In the same way as for the divergent lens, the convergent lens 80 may be constituted of two materials of which the geometry of the interface is reversed with respect to that of a divergent lens.

The lens 80 may comprise two assembled layers of materials: a first layer 81 of material close to the emission area 3 of the transducer element 1, in which the ultrasounds propagate at a higher velocity than in water, and a second layer 82 of material, further away from the emission area 3 of the transducer element 1, in which the ultrasounds propagate at a lower velocity than in water.

In FIG. 8, the interface between the first layer 81 of material and the second layer 82 of material is concave, such that this interface is further away from the emission area 3 at the level of the periphery of the transducer element than in its centre. The interface may not be curved or regular as in FIG. 8. The convergent lens 80 may have an interface between the first layer 81 of material and the second layer 82 of material that is tiered between several levels. These levels are all the further away from the emission area 3 the further they are away from the centre, in a reversed manner compared to the lens illustrated by FIG. 5.

It is also possible to provide that the transducer element 1 is composed of several adjacent emission zones, as in FIG. 6a. However, unlike the embodiment of FIG. 6, the local emission signal is delayed with respect to said overall emission signal by a delay that is all the greater the closer the zone for which said local emission signal is destined is to the centre of the transducer element 1.

Concerning the definition and the calculation of focal lengths, reference could be made to the work of T. L. Szabo, 'Diagnostic Ultrasound Imaging: Inside Out', 2nd Edition, Elsevier Science, 2013, ISBN 9780123964878, in particular pages 191-193.

Thanks to the combination of the individual divergence of the transducer elements, their large size, and their distribution without symmetry, an array of transducers is obtained comprising relatively few elements for a large distribution area of the array, and which makes it possible to deflect the ultrasonic beam over a wide angular range.

The invention is not limited to the embodiment described and represented in the appended figures. Modifications remain possible, notably from the point of view of the constitution of the various technical characteristics or by substitution of technical equivalents, without however going beyond the domain of protection of the invention.

The invention claimed is:

1. Matrix array of ultrasonic transducer elements forming a phased array configured to emit and deflect an ultrasonic beam of ultrasounds over an angular range, said phased array of transducer elements comprising a plurality of transducer elements that are distributed over a distribution area, each of the transducer elements being configured to emit, from an emission area, ultrasounds at a frequency comprised between 100 kHz and 100 MHz in a direction of a working volume, said transducer elements of the phase array being configured to be activated according to successive phases in order to emit and deflect the ultrasonic beam over an angular range, thereby forming a phased array scanning a working volume, wherein:

each of the transducer elements of the phased array is configured to emit ultrasounds in a divergent manner at least at the level of the working volume, each transducer element of the phased array having an angular acceptance at least 10% greater than that of an equivalent flat transducer of same dimension at the working volume, said angular acceptance being an angular opening for which the measured amplitude is above −3 dB compared to a maximum measured amplitude in water at 30° C.;

said transducer elements each have a largest dimension of their emission area greater than 1.5 times the wavelength in water at 30° C. of the ultrasounds to be emitted by said transducer element;

the distribution of the transducer elements over the distribution area of the phased array is aperiodic.

2. The matrix array of ultrasonic transducer elements according to claim 1, wherein the distribution of the transducer elements over the distribution area has an absence of symmetry.

3. The matrix array of ultrasonic transducer elements according to claim 1, wherein the array of transducers comprises at least 64 transducer elements and the largest dimension of the distribution area over which said transducer elements are distributed is greater than twelve times the wavelength of the ultrasounds in water at 30° C.

4. The matrix array of ultrasonic transducer elements according to claim 3, wherein the distribution area has a concave geometry seen from the direction of emission of the ultrasonic waves.

5. The matrix array of ultrasonic transducer elements according to claim 1, wherein the emission area of the transducer elements has a convex shape seen from a direction of emission of the ultrasound.

6. The matrix array of ultrasonic transducer elements according to claim 1, wherein each transducer element is provided with a divergent acoustic lens.

7. The matrix array of transducer elements according to claim 6, wherein the divergent acoustic lens comprises at least two layers of materials arranged in the direction of emission, a first layer of material close to the transducer element, in which the ultrasounds propagate at a higher velocity than in water, and a second layer of material, further away from the transducer element, in which the ultrasounds propagate at a lower velocity than in water.

8. The matrix array of ultrasonic transducer elements according to claim 7, wherein the interface between the two layers of materials of the divergent acoustic lens has a convex shape, such that the distance between said interface and the emission area is greater at the centre of the emission area compared to at the periphery of the emission area.

9. The matrix array of ultrasonic transducer elements according to claim 1, wherein each transducer element is composed of several emission zones each commanded in emission by a local emission signal, and a phase shifter receiving from a command channel an overall emission signal for the whole of a transducer element and emitting in the direction of each of the emission zones of said transducer element the local emission signal specific to said emission zone, said local emission signal being delayed with respect to said overall emission signal by a delay that is all the greater the further away the zone for which said local emission signal is destined is from the centre of the transducer element.

10. The matrix array of ultrasonic transducer elements according to claim 1, wherein the elementary focal length between the emission area of a transducer element and the elementary focal point of said transducer element is less than the overall focal length between the distribution area and an overall focal point of the matrix array of ultrasonic transducer elements.

11. The matrix array of ultrasonic transducer elements according to claim 10, wherein the transducer elements each have an elementary focal point distinct from the elementary focal points of the other transducer elements.

12. The matrix array of ultrasonic transducer elements according to claim 10, wherein each transducer element is provided with a convergent acoustic lens.

13. The matrix array of ultrasonic transducer elements according to claim 10, wherein each transducer element is composed of several emission zones each commanded in emission by a local emission signal, and a phase shifter receiving from a command channel an overall emission signal for the whole of a transducer element and emitting in the direction of each of the emission zones of said transducer element the local emission signal specific to said emission zone, said local emission signal being delayed with respect to said overall emission signal by a delay that is all the greater the closer the zone for which said local emission signal is destined is to the centre of the transducer element.

* * * * *